Oct. 10, 1939.   L. L. NEEBE   2,175,550
BALL AND SLIP JOINT FOR LOCOMOTIVE STEAM PIPES
Filed Oct. 28, 1937
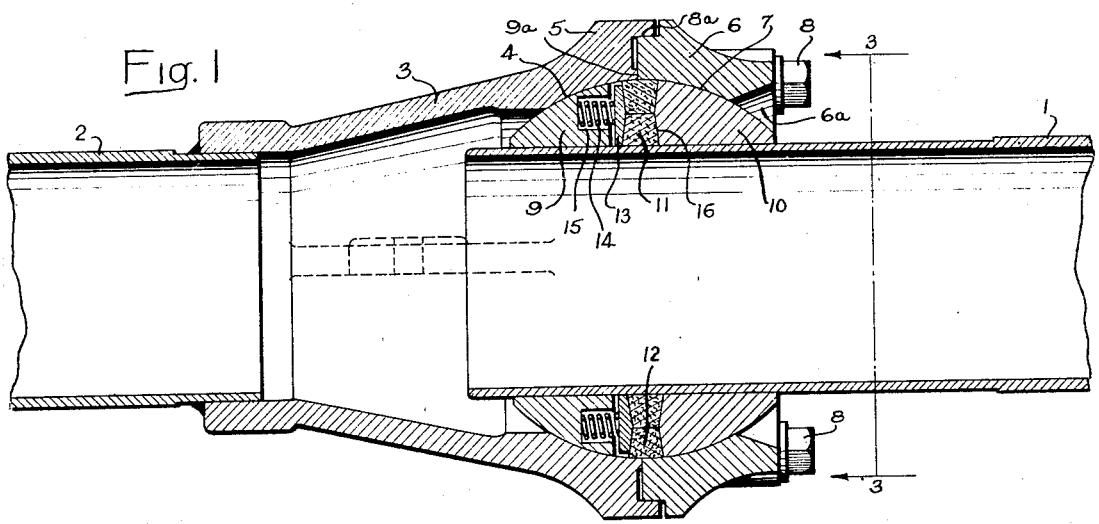
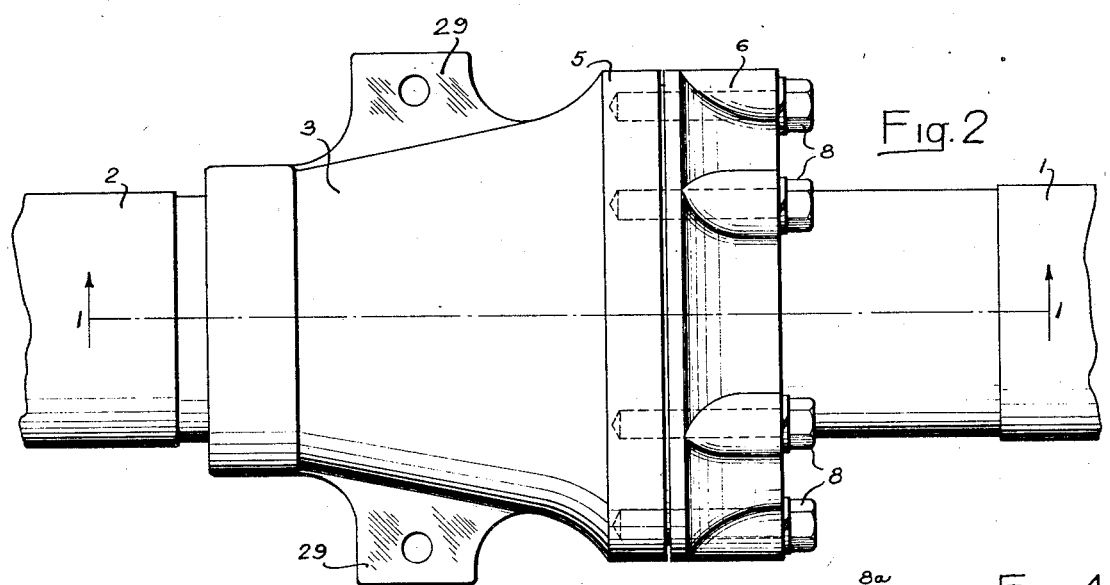
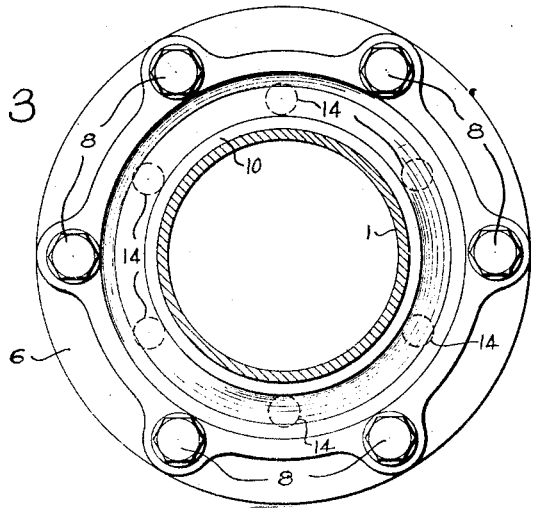
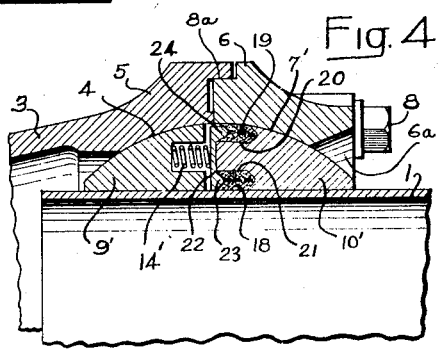
INVENTOR
LAWRENCE L. NEEBE
BY
ATTORNEY Patented Oct. 10, 1939

2,175,550

UNITED STATES PATENT OFFICE 2,175,550

BALL AND SLIP JOINT FOR LOCOMOTIVE STEAM PIPES

Lawrence L. Neebe, Woodbury, N. J.

Application October 28, 1937, Serial No. 171,524

7 Claims. (Cl. 285—11)

This invention relates generally to a flexible ball and slip joint such as is particularly useful in the field of locomotive steam pipes wherein considerable flexibility is necessary especially in articulated locomotives.

A great many different designs of joints have heretofore been proposed and used, but it has been found that their efficiency is obtained only at appreciable expense and complication in structure. Such complication adds not only to the initial cost but to maintenance as well.

It is an object of my invention to provide an improved combined ball and slip joint that is relatively simple and economical in construction, operation and maintenance together with maintaining a high degree of efficiency in a sealed joint.

A further object is to provide an improved joint in which certain parts may be readily removed for purposes of inspection or replacement of the packing, the simplification of arrangement and accessibility of parts being helpful during such inspection or repair.

Other objects and advantages will be more apparent to those skilled in the art from the following description of the accompanying drawing in which:

Fig. 1 is a longitudinal sectional view of my improved joint taken on the line 1—1 of Fig. 2;

Fig. 2 is a plan view of Fig. 1;

Fig. 3 is a transverse section taken on the line 3—3 of Fig. 1;

Fig. 4 is a partial sectional view similar to Fig. 1 but showing a modified arrangement of packing embodied in my improved joint.

In the particular embodiments of the invention, such as are disclosed herein merely for the purpose of illustrating certain specific forms among possible others that the invention might take in practice, I have provided as shown in Fig. 1 two pipe sections 1 and 2 which could normally constitute a steam supply pipe of an articulated locomotive. Pipe section 2 has a substantially conical casing 3 secured thereto and provided with a semi-spherical ball seat 4 within a flanged head 5. A keeper ring 6 having a semi-spherical ball seat 7 forming a continuation of seat 4 is suitably secured by bolts 8 to head 5. The ring 6 and head 5 have overlapping annular guiding surfaces 8a, while a narrow steam tight ground joint 9a is formed between the ring and head to avoid the necessity of packing therebetween and at the same time provide a space between the head and ring so that the bolts 8 will not distort the joint. Ring 6 is provided with a relatively large preferably tapered opening 6a to permit ample angular movement between pipe sections 1 and 2. Disposed within the seats are a pair of substantially semi-spherical balls 9 and 10. Annular packing sections 11 and 12 are spring held between the balls 9 and 10 by an annular presser plate 13 urged to the right by a series of individual coiled springs 14. These springs are disposed within suitable axial recesses 15 located at spaced circumferential points of ball 9.

The packings 11 and 12 have oppositely inclined sides 16, Fig. 1, the ball 10 and annular plate 13 being oppositely shaped. The foregoing inclined sides and plate comprise means rendered operative by the springs for causing packing 12 to be radially urged outwardly against the ball seat surfaces 4 and 5 preferably adjacent the joint 9a, while the packing 11 is radially urged inwardly against the surface of pipe section 1 which has a telescopic slidable fit with balls 9 and 10.

In the modification of Fig. 4, the packing 18 and 19 is of the so-called Chevron type each comprising a series of annular V-shaped packing elements. Ball 10' has inner and outer annular recesses 20 and 21 with V-shaped bottoms to receive the Chevron packing. An annular presser plate 22 has inner and outer V-shaped flanges 23 and 24 engaging the packing, while a series of springs 14' urges plate 22 against the packing to insure a proper sealed joint at all times. The Chevron packing 19 is preferably entirely in contact with ball seat 7' so that normally the Chevron packing does not override joint 9a. In both modifications the conical housing 3 is preferably provided with lateral supporting lugs 29 for attachment to any suitable part of the locomotive or other structure with which my improved joint may be used.

The springs 14 and 14' function not only to laterally force the packings against the ball seats and the straight cylindrical walls of the telescoping pipes 1 but also serves to press the balls 9, 10 and 9', 10' to their respective ball seats.

From the foregoing disclosure it is seen that I have provided an extremely simple and yet very effective combined ball and slip joint employing a minimum number of parts which are so constructed and arranged as to be highly compact but without any material restriction in the flexibility of the joint and without entailing unnecessary labor or care in assembling or disassembling the joint such as during inspection or repair. The two ball sections such as 9 and 10 may be structurally removed as a unit and individually replaced if necessary without in any way affecting the remaining structure, thereby permitting complete overhauling of the joint with a minimum number of replaceable parts in case any particular part is excessively worn. The compactness and simplicity are particularly increased by virtue of the springs 14 and 14' being entirely contained within the ball structure.

It will of course be understood that various changes in details of construction and arrangement of parts may be made by those skilled in the art without departing from the spirit of the invention as set forth in the appended claims.

I claim:

1. A flexible pipe joint comprising, in combination, a casing and ring secured thereto, semi-spherical seats formed in said casing and ring, a pair of semi-spherical ball sections seated respectively against the seats of said casing and ring, each ball section having a circular axial opening, a pipe extending through and having free slidable movement with respect to each of said openings, a spring interposed between said ball sections to yieldingly press each of the same to said seats regardless of the relative axial relation between said casing and pipe, packing interposed between one of said ball sections and said spring, and means rendered operative by said spring for causing said packing to exert a lateral sealing contact with at least one of said spherical seats.

2. A flexible pipe joint comprising, in combination, a casing and ring secured thereto, semi-spherical seats formed in said casing and ring, a pair of semi-spherical ball sections seated respectively against the seats of said casing and ring, each ball section having a circular axial opening, a pipe extending through and having free slidable movement with respect to each of said openings, a spring interposed between said ball sections to yieldingly press each of the same to said seats regardless of the relative axial relation between said casing and pipe, packing interposed between one of said ball sections and said spring, and means rendered operative by said spring for causing said packing to exert a lateral force in an outward direction against one of said spherical seats and in an inward direction against said pipe.

3. A flexible pipe joint comprising, in combination, a casing and ring secured thereto, semi-spherical seats formed in said casing and ring, a pair of semi-spherical ball sections seated respectively against the seats of said casing and ring, each ball section having a circular axial opening, a pipe extending through and having free slidable movement with respect to each of said openings, a spring interposed between said ball sections to yieldingly press each of the same to said seats regardless of the relative axial relation between said casing and pipe, at least one of said ball sections having a surface inclined so that the radial component thereof is outward, and packing interposed between said surface and said spring whereby the spring pressure causes the packing to react upon said inclined surface and thereby exert a lateral sealing force against a ball seat.

4. A flexible pipe joint comprising, in combination, a casing and ring secured thereto, semi-spherical seats formed in said casing and ring, a pair of semi-spherical ball sections seated respectively against the seats of said casing and ring, each ball section having a circular axial opening, a pipe extending through and having free slidable movement with respect to each of said openings, a spring interposed between said ball sections to yieldingly press each of the same to said seats regardless of the relative axial relation between said casing and pipe, at least one of said ball sections having a surface inclined so that the radial component thereof is outward, packing interposed between said surface and said spring whereby the spring pressure causes the packing to react upon said inclined surface and thereby exert a lateral sealing force against a ball seat, and a presser plate yieldingly urged by said spring means against the side of said packing opposite to said inclined surface.

5. A flexible pipe joint comprising, in combination, a casing and ring secured thereto, semi-spherical seats formed in said casing and ring, a pair of semi-spherical ball sections seated respectively against the seats of said casing and ring, each ball section having a circular axial opening, a pipe extending through and having free slidable movement with respect to each of said openings, a spring interposed between said ball sections to yieldingly press each of the same to said seats regardless of the relative axial relation between said casing and pipe, a presser plate, one of said ball sections and said presser plate having substantially radially opposed surfaces whose outer portions diverge from each other in passing toward said spherical seats and whose inner portions diverge from each other in passing toward the axis of said seats, packing interposed between said opposed diverging surfaces, and a spring interposed between said presser plate and the other of said ball sections, said spring means being operative to cause said inclined surfaces to laterally force said packing outwardly into sealing contact with at least one of said semi-spherical seats and into sealing contact with said telescopic pipe.

6. A flexible pipe joint comprising, in combination, a casing and ring secured thereto, semi-spherical seats formed in said casing and ring, a pair of semi-spherical ball sections seated respectively against the seats of said casing and ring, said ball sections each being axially movable relative to said seats, an annular recess in one of said ball sections adjacent one of said spherical seats, said annular recess extending to the outer surface of the ball section, annular rings of substantially V-shaped packing disposed within said recess, and spring operated means interposed between the other of said ball sections and said packing to laterally force the latter into sealing contact with said spherical seat and to also cause said ball sections to be held in engagement with said seats.

7. A flexible pipe joint comprising, in combination, a casing and a ring secured thereto, semi-spherical seats provided in said casing and ring, a pair of semi-spherical ball sections seated respectively against said seats, a pipe having telescopic slidable relation with said ball sections, concentric annular recesses in one of said ball sections, said recesses extending respectively to the outer surface of said ball section and to the inner surface thereof adjacent said pipe, annular rings of V-type packing disposed within said recesses, and spring operated means interposed between the other of said ball sections and said packing to laterally force the latter into sealing contact with said spherical seat and into sealing contact with said pipe and also to cause said ball sections to be held in engagement with their respective seats.

LAWRENCE L. NEEBE.